(No Model.) 2 Sheets—Sheet 1.

M. LOWREY.
HEDGE TRIMMING MACHINE.

No. 272,843. Patented Feb. 20, 1883.

WITNESSES:
Fred. G. Dieterich.
Jas. H. Baxter.

INVENTOR.
Milton Lowrey
By Myers & Co.
ATTORNEYS.

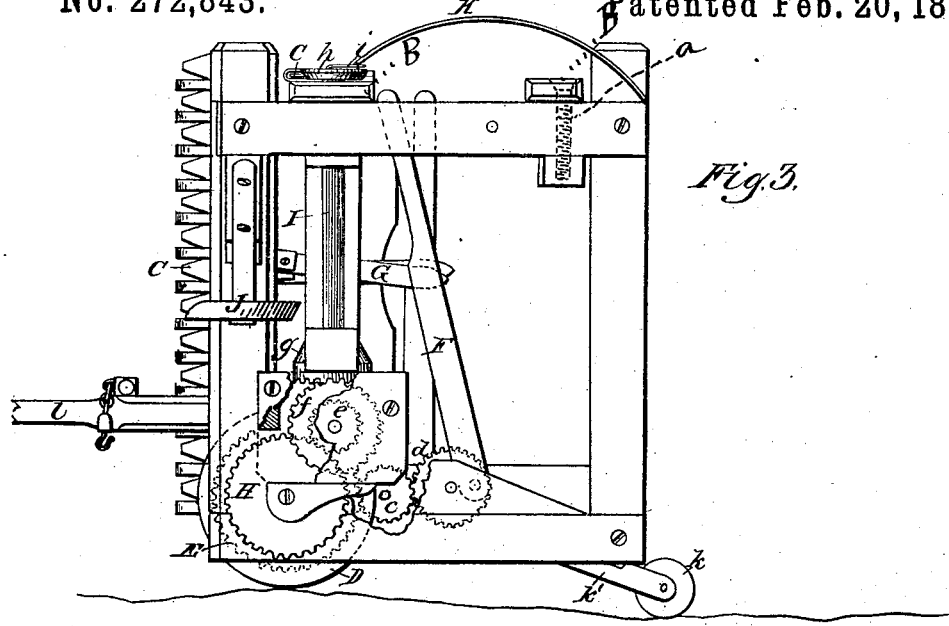
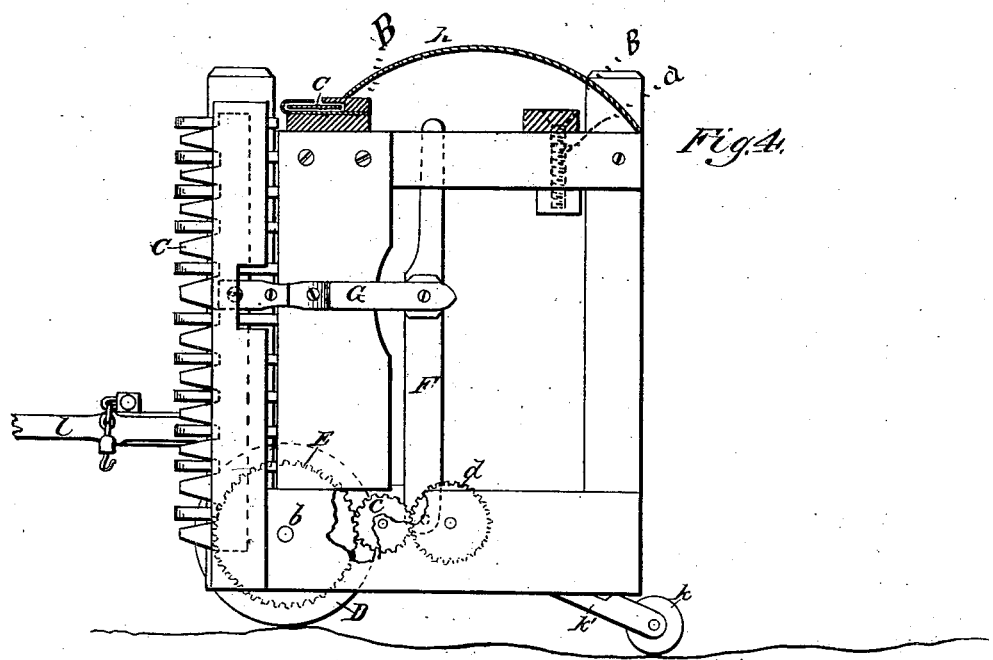

UNITED STATES PATENT OFFICE.

MILTON LOWREY, OF SPRAGUE, MISSOURI.

HEDGE-TRIMMING MACHINE.

SPECIFICATION forming part of Letters Patent No. 272,843, dated February 20, 1883.

Application filed October 7, 1882. (No model.)

*To all whom it may concern:*

Be it known that I, MILTON LOWREY, a citizen of the United States of America, residing at Sprague, in the county of Bates and State of Missouri, have invented certain new and useful Improvements in Hedge-Trimming Machines, of which the following is a specification, reference being had therein to the accompanying drawings.

This invention pertains to improvements in hedge or brush cutting or trimming machines; and it consists in the combination and arrangement of parts, substantially as hereinafter more fully set forth.

Figure 1:
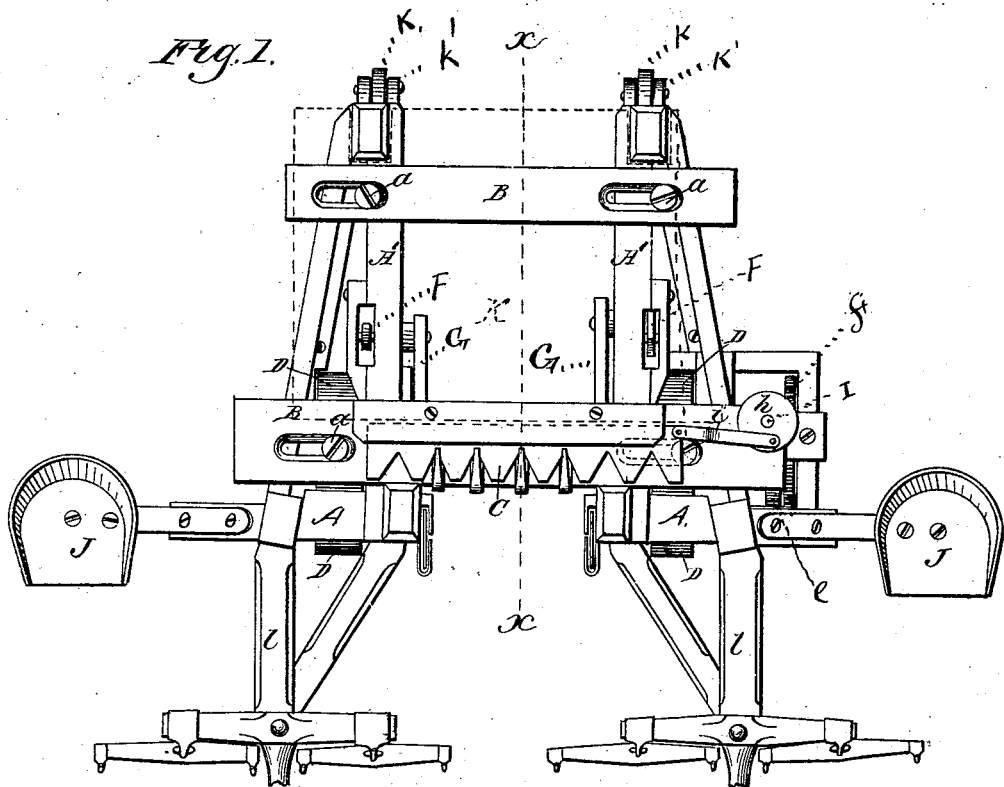
Figure 2:
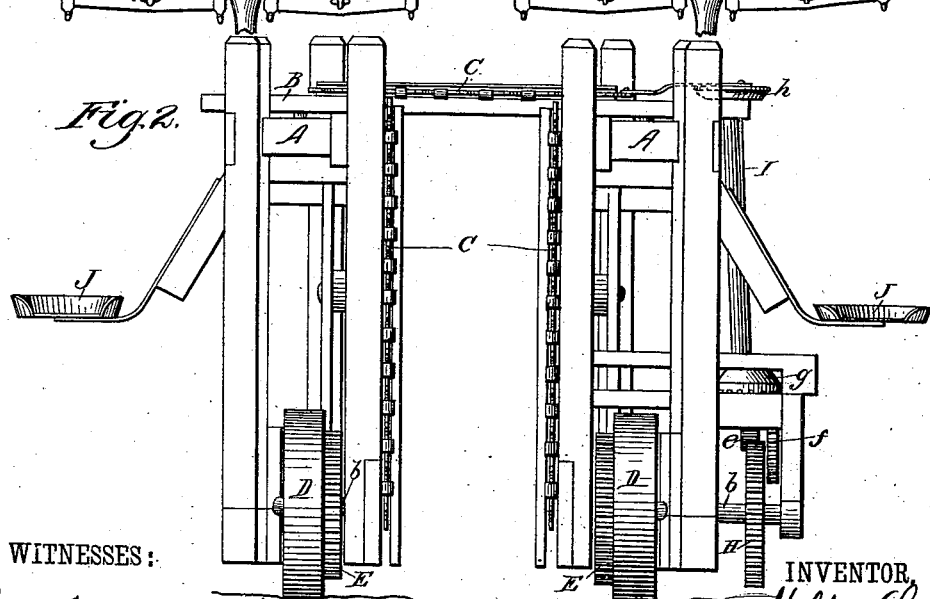

In the accompanying drawings, Figure 1 is a plan view of my improved machine. Fig. 2 is a front view thereof. Fig. 3 is a side elevation of the same, and Fig. 4 is a sectional elevation on the line $x\ x$ of Fig. 1.

In carrying out my invention I employ two frames, A A, each consisting of three uprights and two cross-bars, extending from front to rear, connecting said posts. Said frames are connected crosswise by the adjustable slotted bars B, receiving adjusting-screws $a$, working in their slots, and the said frames and their extensions, and permitting the frames to move laterally the length of the slots. The purpose of this arrangement of parts is to enable the adjustment of the upright frames according to the width the rows of hedge or brush are grown apart. Adapted to work upon the inner front sides of said frames, and at the front edge of the front cross-bar, B, are sickle or cutter bars C, as clearly seen in Fig. 2. These cutter-bars are composed each of a toothed knife-edged bar sliding upon a fixed fingered bar, its fingers being bent or turned over the toothed bar, but not so as to hug it, as seen in Figs. 1 and 4.

D D are the transporting and driving wheels, screwed upon short independent axles or shafts $b$, bearing in the frames A, near the lower ends of the latter.

Secured upon the inner side of each of the wheels D is a toothed or cog wheel, E, with which gears a pinion, $c$, suitably hung in a base-piece of each of the frames A, and engaging with a second pinion, $d$.

Eccentrically connected to the pinions $d$ are pitmen F, in turn connected to levers G, pivoted upon uprights of the cross-bars A', and connected to the side cutter-bars of the frames A, to effect the operation of said cutter-bars.

H is an additional cog or toothed wheel, secured upon the axle or shaft of one of the driving-wheels D. This wheel gears with a pinion, $e$, whose shaft is suitably hung in a support of one of the frame-extensions, and carries a larger pinion, $f$. The latter gears with a horizontally-revolving cog-wheel, $g$, fast to the lower end of an upright shaft, I, suitably journaled in the framing of the machine. This shaft I is provided at its upper end with a disk, $h$, eccentrically connected by a crank-bar or pitman, $i$, to the horizontal cutter-bar C, whereby it receives its motion.

Supported one upon the outside of each of the frames A of the machine are the driver's seats J, for permitting the driving of the latter from either side thereof.

$k\ k$ are "trucks" or small wheels, connected by bars $k'$ to the rear end of the machine, one being arranged at each side thereof to aid in transporting or moving the machine.

$l\ l$ are the tongues, secured to the frame A and the whiffletrees, for hitching the team to the machine.

K is a curved plate or fender, affixed to the upper part of the standards of the frame, as shown, to prevent the trimmings of the brush from falling upon the inner mechanism of the device.

I claim—

In a hedge-trimming machine, the slotted cross-bars B B, and the adjusting-screws $a\ a$, arranged on the top of the frame A, whereby the two sections of said frame are held within the limit of adjustment, substantially as shown and specified.

In testimony whereof I affix my signature in presence of two witnesses.

<div style="text-align:right">his<br>MILTON × LOWREY.<br>mark.</div>

Witnesses:
S. Z. AUGDEN,
FRANK LOWREY.